No. 735,389. PATENTED AUG. 4, 1903.
M. KELLER.
LETTER BOX.
APPLICATION FILED DEC. 23, 1902.
NO MODEL. 2 SHEETS—SHEET 1.
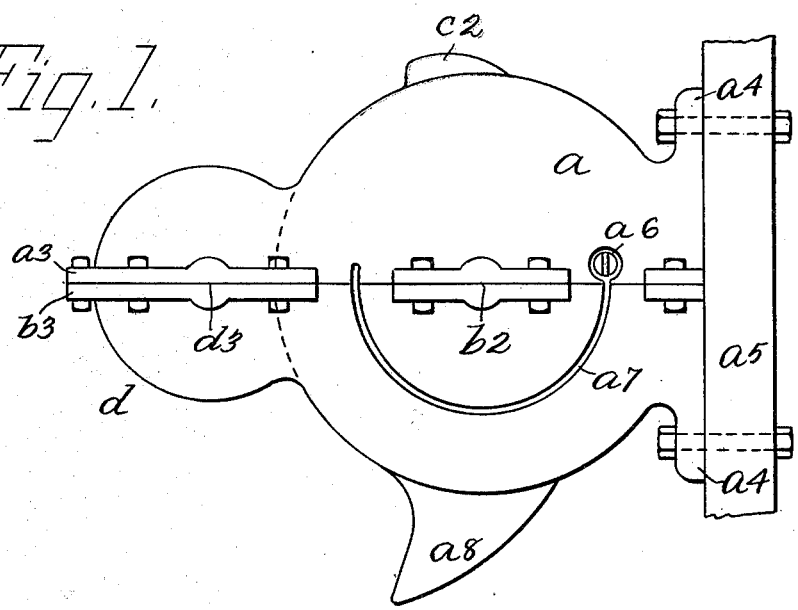
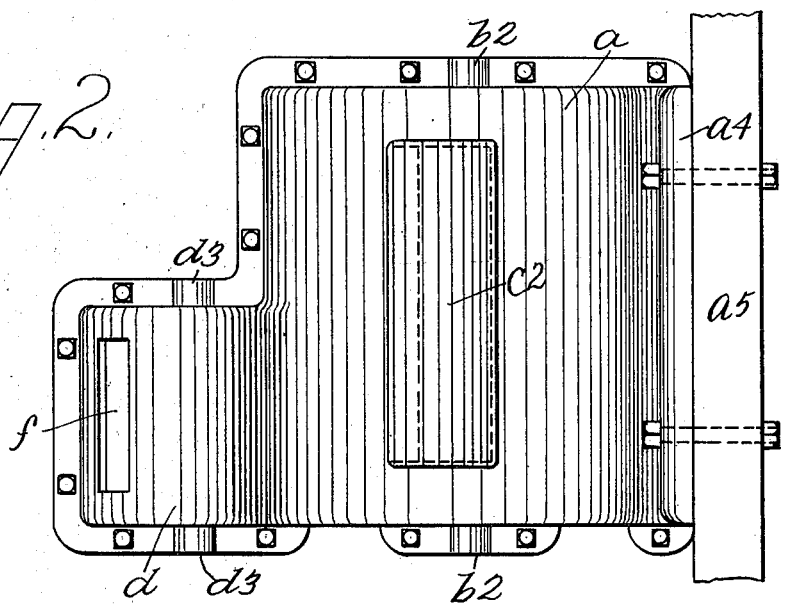
WITNESSES
J. C. Larsen
F. A. Stewart.
INVENTOR
Michael Keller
BY Edgar Late & Co.
ATTORNEYS No. 735,389. PATENTED AUG. 4, 1903.
M. KELLER.
LETTER BOX.
APPLICATION FILED DEC. 23, 1902.
NO MODEL. 2 SHEETS—SHEET 2.
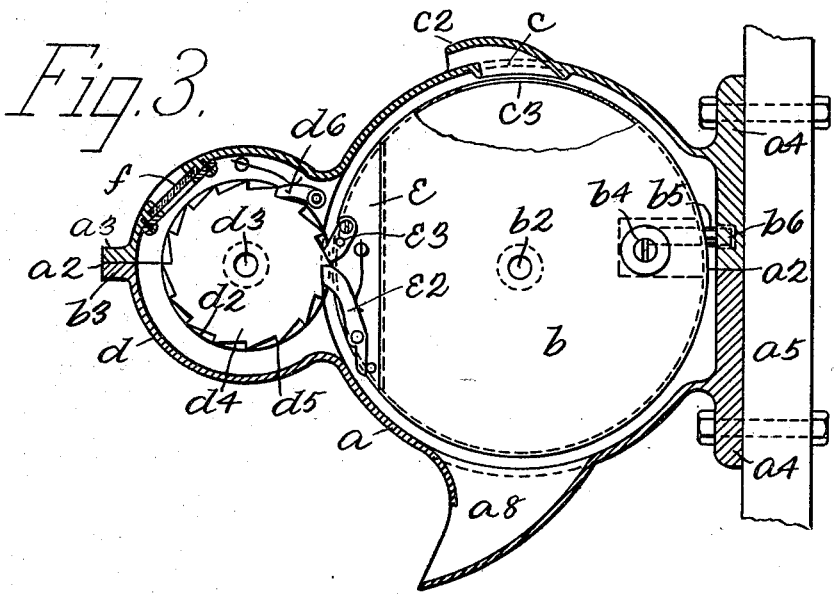
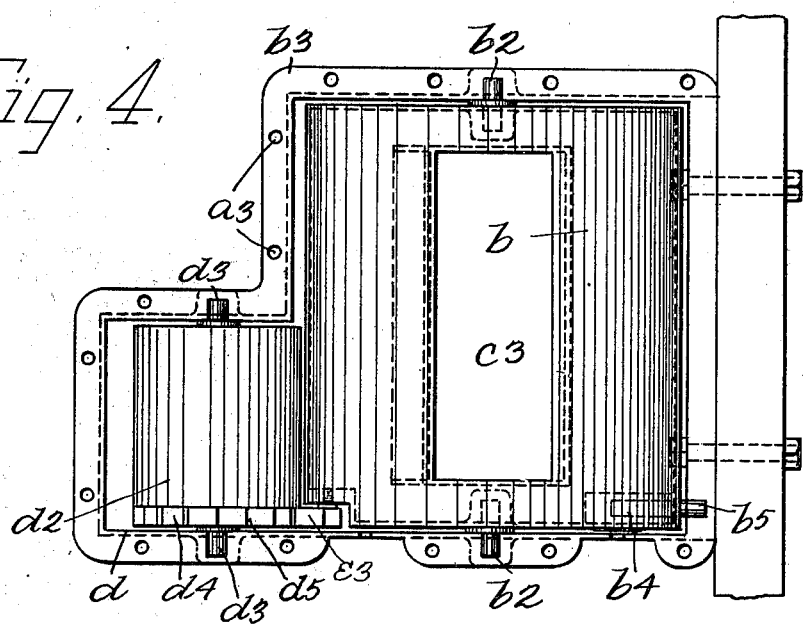
WITNESSES
J. C. Larsen
F. A. Stewart
INVENTOR
Michael Keller.
BY
Edgar Tate & Co.
ATTORNEYS No. 735,389. Patented August 4, 1903.

UNITED STATES PATENT OFFICE.

MICHAEL KELLER, OF NEW YORK, N. Y., ASSIGNOR OF ONE-HALF TO WILLIAM S. PICKARD, OF NEW YORK, N. Y.

LETTER-BOX.

SPECIFICATION forming part of Letters Patent No. 735,389, dated August 4, 1903.

Application filed December 23, 1902. Serial No. 136,322. (No model.)

*To all whom it may concern:*

Be it known that I, MICHAEL KELLER, a citizen of the United States, residing at New York, in the county of New York and State of New York, have invented certain new and useful Improvements in Letter-Boxes, of which the following is a full and complete specification, such as will enable those skilled in the art to which it appertains to make and use the same.

The object of this invention is to provide an improved letter-box which may be secured to any suitable support and in any desired manner and which is so constructed that it cannot be opened except by a party having the proper key and which possesses other novel features which facilitate the removal of mail-matter therefrom; and with this and other objects in view the invention consists in a letter-box of the class specified constructed as hereinafter described and claimed.

The invention is fully disclosed in the following specification, of which the accompanying drawings form a part, in which the separate parts of my improvement are designated by suitable reference characters in each of the views, and in which—

Figure 1 is an end view of my improved letter-box; Fig. 2, a plan view thereof; Fig. 3, a sectional end view thereof, and Fig. 4 a plan view of the bottom half of the outer casing of the box and the part contained therein.

In the practice of my invention I provide a letter-box comprising an outer cylindrical casing $a$ and an inner cylindrical casing $b$. The casing $a$ is divided horizontally, as shown at $a^2$, and the separate parts thereof are in practice bolted together at $a^3$, said parts being provided, respectively, with flanges $a^3$ and $b^3$, by means of which they are secured together, as shown and as above described. The outer casing $a$ is also provided in the form of construction shown with side flanges $a^4$, by means of which it is secured to a support $a^5$; but this connection with a support may be made in any desired manner.

The casing $b$ is supported by central journals at $b^2$, on which it is free to turn, and at the back of the casing $b$ is a lock $b^4$, the block $b^5$ of which is adapted to enter a recess $b^6$ in the back wall of the outer casing $a$, and in order to turn the inner casing, as hereinafter described, a key is inserted through the end of the outer casing $a$ at $a^6$, as shown in Fig. 1, and the inner casing is turned by the handle of the key after the bolt $b^5$ of the lock has been withdrawn, and in this operation the shank of the key passes through a slot $a^7$, formed in the end of the outer casing $a$.

At the bottom of the outer casing $a$ is a downwardly and forwardly curved discharge-spout $a^8$, and in the top of said outer casing is an opening $c$, covered by a shield $c^2$ and through which mail-matter may be inserted, and in the top of the casing $b$ when in its locked position and directly under the opening $c$ in the outer casing $a$ is an opening $c^3$, through which the mail-matter passes into the inner casing $b$.

The main outer casing $a$ is also provided at the front thereof with a supplemental casing $d$, in which is mounted a cylinder $d^2$, the shaft of which has bearings at $d^3$, and the cylinder $d^2$ is provided at one end with a ratchet-wheel $d^4$, having ratchet-teeth $d^5$, and in the rear upper portion of the supplemental casing $d$ is pivoted a spring-operated pawl $d^6$, which operates in connection with the ratchet-teeth $d^5$ to prevent the backward movement of the cylinder $d^2$.

The inner casing $b$, directly opposite the lock $b^4$, is provided in the end thereof with a vertically-arranged space $e$, in which is pivoted a pawl $e^2$, which also operates in connection with the ratchet-teeth $d^5$, and secured in the space $e$ above the pawl $e^2$ is a lug or projection $e^3$, which is adapted to bear on the back of the teeth $d^5$.

The normal position of the parts is that shown in Fig. 3, and in operation the mail-matter is inserted through the opening $c$ and falls into the inner casing $b$. Whenever it is desired to remove the mail-matter from the box, a key is inserted into the lock $d^4$, the lock-block $b^5$ is withdrawn, and the inner casing $b$ is turned by means of the key, the shank of which moves through the segmental slot $a^7$ in the end of the main outer casing $a$. When the inner casing $b$ is turned through one-half a revolution, the opening $c^3$ will be directly over the discharge-spout $a^8$, and the mail-matter will drop out of the casing $b$ on through said spout into any bag or receptacle held at the end of said spout.

The cylinder $d^2$ is intended as means for showing at what times the mail-matter will be collected, and in practice the hours or times at which this is done will be printed longitudinally of the surface of the said cylinder, and the same may be seen through a transparent panel $f$, set into the upper front portion of the supplemental casing $d$. The lines of printed matter on the cylinder $d^2$ indicate at what time the mail-matter will be collected, and any other information desired to be placed on said cylinder may be arranged in any desired manner and at any preferred distance apart, and the ratchet-teeth at the end of the cylinder $d^2$ may be arranged so as to turn said cylinder through any desired distance or space at each operation of the casing $b$.

It will be understood that in operating the casing $b$ it is turned to the left through one-half a revolution and is then turned back into the position shown in Fig. 3 and locked in said position. When the casing $b$ is turned to the right, the cylinder $d^2$ is turned through one end space, the width of which is determined by the number of teeth $d^5$, and the lug or projection $e^3$ is designed to prevent the backward movement of the cylinder $d^2$; but as this lug or projection is secured to the casing $b$ it does not interfere with the movement of said cylinder, as hereinbefore described.

My improved letter-box is simple in construction and operation and comparatively inexpensive, and is well adapted to accomplish the result for which it is intended.

Any suitable means may be provided for protecting the opening $c$ in the top of the main outer casing, and my invention is not limited in its connection to the use of the shield $c^2$. It will also be apparent that other changes in and modifications of the construction herein described may be made without departing from the spirit of my invention or sacrificing the essential elements of the invention, and I reserve the right to make all such alterations in the construction herein shown and described as fairly come within the scope of my invention.

Having fully described my invention, what I claim as new, and desire to secure by Letters Patent, is—

1. A letter-box comprising a main outer casing and a supplemental inner casing, said casings being cylindrical in form and the inner casing being rotatable and provided with an opening in the top thereof, the outer casing being also provided at the top with an opening and at the bottom with a discharge-spout and in one end thereof with a segmental slot, and the inner casing being provided with a lock adapted to be operated by a key passed through the said end of the outer casing, and the shank of which is movable in said slot, said main outer casing being also provided at the front thereof with a supplemental casing, a cylinder mounted therein, and means for rotating said cylinder through a predetermined space at each operation of the supplemental casing, substantially as shown and described.

2. A letter-box comprising a main outer casing and a supplemental inner casing, said casings being cylindrical in form and the inner casing being rotatable and provided with an opening in the top thereof, the outer casing being also provided at the top with an opening and at the bottom with a discharge-spout and in one end thereof with a segmental slot, and the inner casing being provided with a lock adapted to be operated by a key passed through the said end of the outer casing, and the shank of which is movable in said slot, said main outer casing being also provided at the front thereof with a supplemental casing, a cylinder mounted therein, and means for rotating said cylinder through a predetermined space at each operation of the supplemental casing, consisting of ratchet-teeth connected with said cylinder and a pawl connected with the inner casing, substantially as shown and described.

3. A letter-box comprising a main cylindrical casing having top and bottom openings, an inner casing mounted therein and rotatable therein and provided at the top with an opening, the main outer casing being provided at the front with a supplemental casing, a cylinder mounted in the supplemental casing, means for locking the inner casing and turning it through a part of a revolution, and devices for turning said cylinder through a predetermined space, substantially as shown and described.

4. A letter-box comprising a main outer casing, a rotatable inner casing mounted therein and adapted to be locked to the main outer casing, the main outer casing being also provided at the front thereof with a supplemental casing, a cylinder mounted therein and provided with ratchet-teeth, a pawl connected with the rotatable inner casing and operating in connection with said teeth, another pawl in the supplemental casing operating in connection with said teeth, and a lug or projection secured to the inner rotatable casing and also operating in connection with said teeth, substantially as shown and described.

5. A letter-box comprising a main outer cylindrical casing and a rotatable inner casing mounted therein and adapted to be locked thereto, said casings being both provided with openings in the top thereof and the main outer casing being provided in the bottom thereof with another opening, a supplemental casing connected with the main outer casing, a cylinder mounted therein, and means whereby said cylinder is turned through a predetermined space at each movement of the inner rotatable cylinder, substantially as shown and described.

6. A letter-box comprising a main outer cylindrical casing and a rotatable inner casing mounted therein and adapted to be locked thereto, said casings being both provided with openings in the top thereof and the main outer casing being provided in the bottom thereof with another opening, a supplemental casing connected with the main outer casing, a cylinder mounted therein, and means whereby said cylinder is turned through a predetermined space at each movement of the inner rotatable cylinder, said supplemental casing being also provided with a transparent panel through which said cylinder may be seen, substantially as shown and described.

7. A letter-box comprising a main outer casing $a$, an inner casing $b$ rotatable therein and adapted to be locked thereto, a supplemental casing $d$ connected with the main outer casing, a cylinder $d^2$ mounted therein, means for operating the inner rotatable casing $b$, and devices whereby the cylinder $d^2$ is turned through a predetermined space when the casing $b$ is partially turned, substantially as shown and described.

8. A letter-box comprising a main outer casing and a supplemental inner casing rotatable therein, the outer casing being provided at the top and bottom with an opening, and the inner casing being provided in the top thereof with an opening and means for locking said inner casing so that the opening in the top thereof will register with the opening in the top of the main outer casing, and means whereby the inner casing may be rotated, substantially as shown and described.

In testimony that I claim the foregoing as my invention I have signed my name, in presence of the subscribing witnesses, this 16th day of December, 1902.

MICHAEL KELLER.

Witnesses:
F. A. STEWART,
C. E. MULREANY.